(12) United States Patent
Post

(10) Patent No.: US 6,664,880 B2
(45) Date of Patent: Dec. 16, 2003

(54) INDUCTRACK MAGNET CONFIGURATION

(75) Inventor: Richard Freeman Post, Walnut Creek, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/896,583

(22) Filed: Jun. 29, 2001

(65) Prior Publication Data

US 2003/0006871 A1 Jan. 9, 2003

(51) Int. Cl.[7] .............................. H01F 7/02; B60L 13/00
(52) U.S. Cl. ......................... 335/306; 310/12; 310/90.5; 104/281; 104/286
(58) Field of Search ................................. 335/296–306; 310/90.5, 12; 104/281–286

(56) References Cited

U.S. PATENT DOCUMENTS

| | | | | |
|---|---|---|---|---|
| 5,107,238 A | * | 4/1992 | Leupold | 335/306 |
| 5,313,182 A | * | 5/1994 | Blache | 335/306 |
| 5,722,326 A | * | 3/1998 | Post | 104/281 |
| 6,374,746 B1 | * | 4/2002 | Fiske | 104/138.1 |

* cited by examiner

Primary Examiner—Ramon M Barrera
(74) Attorney, Agent, or Firm—John P. Wooldridge; Alan H. Thompson

(57) ABSTRACT

A magnet configuration comprising a pair of Halbach arrays magnetically and structurally connected together are positioned with respect to each other so that a first component of their fields substantially cancels at a first plane between them, and a second component of their fields substantially adds at this first plane. A track of windings is located between the pair of Halbach arrays and a propulsion mechanism is provided for moving the pair of Halbach arrays along the track. When the pair of Halbach arrays move along the track and the track is not located at the first plane, a current is induced in the windings and a restoring force is exerted on the pair of Halbach arrays.

25 Claims, 3 Drawing Sheets

INDUCTRACK MAGNET CONFIGURATION

The United States Government has rights in this invention pursuant to Contract No. W-7405-ENG48 between the United States Department of Energy and the University of California for the operation of Lawrence Livermore National Laboratory.

BACKGROUND OF THE INVENTION

1. Field of the Invention

The present invention relates generally to magnetic levitation systems for moving objects, and more specifically, to an improved magnetic levitation train system.

2. Description of Related Art

Halbach arrays, invented by Klaus Halbach in the 1980s for use in particle accelerators, represent a maximally efficient way to arrange permanent-magnet material when it is desired to produce a strong periodic magnetic field adjacent to the array. The beauty of the concept is that the effect of the cross-magnetized magnet bars in the array is to enhance the periodic magnetic field at the front face of the array, while canceling it back face of the array. Not only is the field enhanced, but analysis shows that in a long array the horizontal and vertical components are nearly purely sinusoidal in their spatial variation, with negligible higher spatial harmonics. If the Halbach array is then fabricated from high-field permanent-magnet material, such as NdFeB, peak fields near the front face of the array of order 1.0 Tesla are possible.

Particularly for lower-speed applications of magnetic levitation, such as for urban train systems, it is desirable to employ systems that are simple in construction and operation and that have low drag at urban speeds. Conventional maglev systems, that is, ones employing superconducting coils, or ones requiring servo-controlled electromagnets for levitation, appear to fall short on one or more of these counts.

Since it was first proposed the magnetic levitation of trains has been perceived to offer many potential advantages over conventional train technology. Besides the ability of maglev trains to operate a higher speeds than are deemed possible with wheel-and-rail trains, maglev trains should require less maintenance and be much smoother-riding and quieter than conventional rail systems. These perceived advantages have stimulated major development programs, particularly in Germany and Japan, to solve the technical and economic challenges of this new technology. These decades-long efforts have resulted in impressive demonstration systems, but as yet have not led to commercially operating rail systems in these countries. Factors that have slowed the deployment of high-speed maglev trains based on these technologies include technical complexity and high capital cost.

In an attempt to address these issues by taking advantage of new concepts and new materials, a different approach, called the Inductrack, was proposed. The first-proposed Inductrack disclosed in U.S. Pat. No. 5,722,326, titled "Magnetic Levitation System For Moving Objects", referred to herein as Inductrack I, employs special arrays of permanent magnets ("Halbach arrays"), on the moving train car to produce the levitating magnetic fields. These fields interact with a close-packed ladder-like array of shorted circuits in the "track" to levitate the train car. In this first form of the Inductrack, single arrays moving above the track produced the levitation. Whereas the Japanese maglev system employs superconducting coils and the German system requires servo-controlled electromagnets for levitation, the Inductrack is based on the use of high-field permanent magnet material, arranged in a special configuration called a Halbach array.

In the Inductrack maglev system Halbach arrays are used, located below the train car. When in motion the magnetic field of these arrays then induces currents in a special "track" made up of close-packed shorted circuits. Analysis has shown that the combination of the three elements, Halbach arrays, NdFeB magnet material, and close-packed circuits in the track result in the possibility of achieving levitation forces in excess of 40 metric tons per square meter of levitating magnets, corresponding to magnet weights of only a few percent of the levitated weight. The use of Halbach arrays, high-field magnet material and close-packed circuits as employed in the Inductrack thus overcomes previous concerns, e.g., inadequate levitation forces, that led to questioning the practicality of using permanent magnets for maglev trains.

The theoretical analysis of the Inductrack leads to the evaluation of such quantities as the Lift-to-Drag ratio and the levitation power requirements as a function of train speed and of the magnet and track parameters. For the first-proposed, single-Halbach-array, form of the Inductrack, the L/D ratio is given by a simple relationship, given in Equation 1 below.

$$\frac{\text{Lift}}{\text{Drag}} = kv\left[\frac{L}{R}\right] \quad (1)$$

Here $k=2\Pi/\lambda$, where $\lambda$(m.) is the wavelength of the Halbach array. Note that the Lift/Drag ratio increases linearly with the train velocity and that its slope is determined by the inductance (self plus mutual) and the resistance of the track circuits. For a ladder-like track, that is one composed of transverse bars terminated at both ends with shorting buses, typical values for L and R give Lift/Drag ratios of the order of 300 at speeds of 500 km/hr typical of high-speed maglev trains. This ratio is high enough to make the levitation losses small (less than 10 percent) of the aerodynamic losses at such speeds. Also, for the Inductrack the "transition speed," the speed at which the lift has risen to half its final value (and also the speed where the lift and drag forces are equal) is low, of order a few meters/second (walking speeds). Thus the first-proposed form of the Inductrack would seem well suited for high-speed maglev train applications.

However, an examination of the first-proposed form of the Inductrack for its possible use in an urban setting, where the typical speeds are of order one-tenth of that of a high-speed maglev system, shows that the older system leaves something to be desired. Now, unless inductive loading of the track circuits is employed, the Lift/Drag ratio will have dropped to 30 or less. For an urban train car weighing, say, 20,000 kilograms, a Lift/Drag ratio of 30 at 50 km/hr corresponds to a drag force of about 6500 Newtons at a drag power in excess of 90 kilowatts.

SUMMARY OF THE INVENTION

It is an object of the present invention to provide a magnet configuration comprising a pair of Halbach arrays magnetically and structurally connected together and a track located in between such that when the pair of Halbach arrays move along the track and the track is not located at the first plane, a current is induced in the windings and a restoring force is exerted on the pair of Halbach arrays.

It is another object of the invention to attach the Halbach arrays to a vehicle.

Still another object of the invention is to provide windings on the track.

Another object of the invention is to provide windings that comprise a planar array of conductors shorted together at their ends.

An object of the invention is to provide a pair of Halbach arrays that when moving, have a characteristic lift-to-drag ratio at operating loads that can be increased by increasing the area of the pair of Halbach arrays to decrease the downward displacement required to levitate a given weight, and thus decrease the current required for levitation.

These and other objects will be apparent based on the disclosure herein.

In the present invention, referred to sometimes herein as "Inductrack II", dual arrays are used, one above and one below cantilevered track circuits. Important gains result from the use of dual Halbach arrays: First, the levitating (horizontal) component of the magnetic field is approximately double that of a single array. This circumstance implies that the same levitating force per unit area can be achieved with half the current in the track, i.e., with one-fourth of the resistive power loss. Second, the lower array, when it is phased with respect to the upper array so as to increase the horizontal (levitating) magnetic field component, decreases the vertical field component (the component that excites the current), allowing the optimization of the level of this current. By contrast, in the previous, single array, Inductrack I system the ratio of the vertical field component to the horizontal field component is fixed, so that it is not possible to adjust their ratio. In Inductrack II adjustment of this ratio is accomplished by (i) adjusting the relative gap spacing between the arrays and the track circuits, (ii) or by varying the width of the upper array relative to the lower array and (iii) or by varying the thickness of the lower array relative to the upper array. As a result not only is the levitating power requirement reduced by factors of three or more relative to the earlier Inductrack, but the drag peak, occurring near the lift-off speed, is also reduced by a comparable factor.

Particularly for lower-speed applications of magnetic levitation, such as to urban train systems, it is desirable to employ systems that are simple in construction and operation and that have low drag at urban speeds. Conventional maglev systems, that is, ones employing superconducting coils, or ones requiring servo-controlled electromagnets for levitation, appear to fall short on one or more of these counts. The present invention, an evolutionary development of the Inductrack maglev system, is aimed at providing a solution to this problem. This new system, as with the first-proposed Inductrack, employs special arrays of permanent magnets, "Halbach arrays," on the moving train car to produce the levitating magnetic fields. These fields interact with a close-packed ladder-like array of shorted circuits in the "track" to levitate the train car. In the first form of the Inductrack single arrays moving above the track produced the levitation. In Inductrack II dual arrays are used, one above and one below cantilevered track circuits. Important gains result from the use of dual Halbach arrays: First, the levitating (substantially horizontal) component of the magnetic field is approximately double that of a single array. This circumstance implies that the same levitating force per unit area can be achieved with half the current in the track, i.e., with one-fourth of the resistive power loss. Second, the lower array, when it is phased with respect to the upper array so as to increase the horizontal (levitating) magnetic field component, decreases the (substantially) vertical field component (the component that excites the current), allowing the optimization of the level of this current. By contrast, in the previous, single array, Inductrack system the ratio of the vertical field component to the horizontal field component is fixed, so that it is not possible to adjust their ratio. In Inductrack II, adjustment of this ratio is accomplished by varying the thickness of the lower arrays relative to the upper array and/or by adjusting the relative gap spacing between the arrays and the track circuits. As a result not only is the levitating power requirement reduced by factors of three or more relative to the earlier Inductrack, but the drag peak, occurring near the lift-off speed, is also reduced by a comparable factor. Theoretical analyses of the Inductrack II configuration and results from computer-based simulations of urban maglev operation will be presented and compared with results for the first-proposed Inductrack system. The present invention is usable for urban speeds (up to 150 kilometers per hour (KPH)) and for high speeds (greater than 150 KPH).

One embodiment of the invention is a magnet configuration comprising a pair of Halbach arrays magnetically and structurally connected together. The Halbach arrays comprise magnet configurations positioned with respect to each other so that a first component of their fields substantially cancels at a first plane between them, and a second component of their fields substantially adds at this first plane. A track of windings is located between the pair of Halbach arrays and a propulsion mechanism is provided for moving the pair of Halbach arrays along the track. When the pair of Halbach arrays move along the track and the track is not located at the first plane, a current is induced in the windings and a restoring force is exerted on the pair of Halbach arrays.

DETAILED DESCRIPTION OF THE INVENTION

Figure 1:
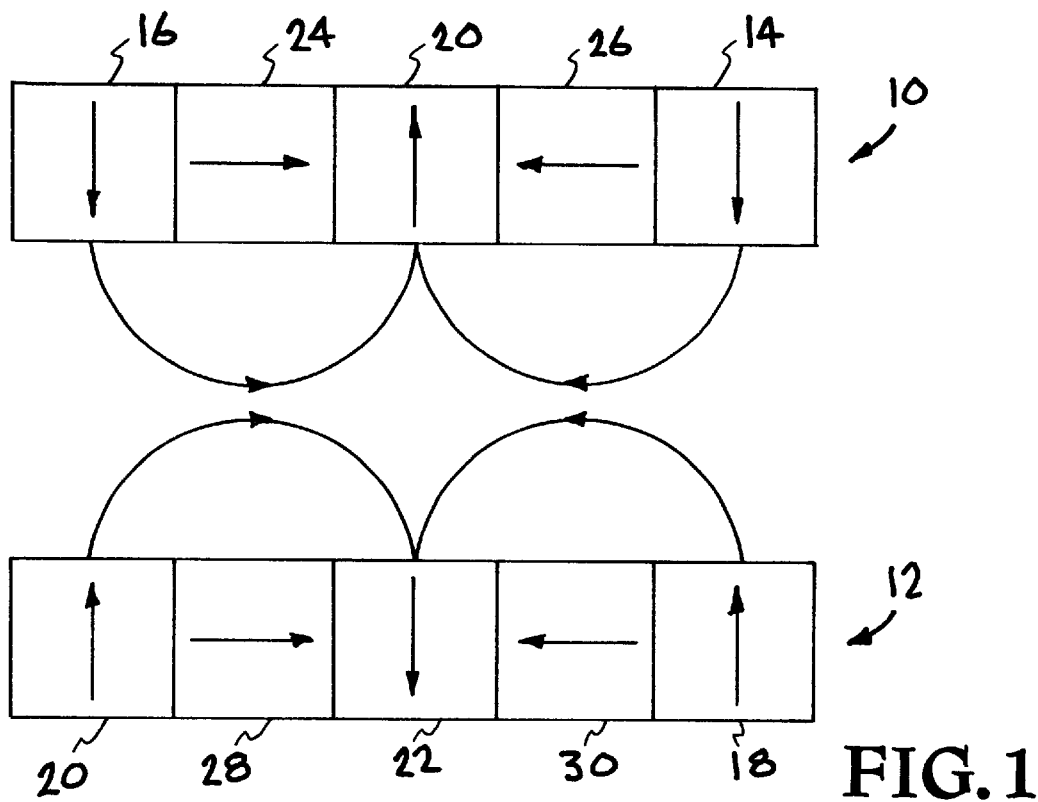
FIG. 1 shows twin Halbach arrays with vertical field cancellation according to the present invention.

The present invention is an improvement over the invention described in U.S. Pat. No. 5,722,326, titled "Magnetic Levitation System For Moving Objects" incorporated herein by reference. The invention described in that patent provides a simple, reliable and less expensive means, than that provided by the prior art, for the magnetic levitation of high-speed objects such as trains. Repelling magnetic forces are produced in the patented invention by the interaction of a flux-concentrated magnetic field (produced by permanent magnets or electromagnets) with an inductively loaded closed electric circuit. When one such element moves with respect to the other a current is induced in the circuit. This current then interacts back on the field to produce a repelling force. These repelling magnetic forces are applied to levitate a high-speed object such as a train. The power required to levitate a train is drawn from the motional energy of the train itself, and represents only a few percent of the several megawatts of power required to overcome aerodynamic drag at high speeds.

The present magnet configuration consists of connected upper and lower Halbach arrays connected on each side of the train car. Between each array pair there is a cantilevered track of windings in the form of a planar array of conductors shorted together at their ends (beyond the ends of the dual Halbach arrays). (In one embodiment, the tracks are tilted from horizontal to provide centering.) The Halbach arrays of the dual assembly are positioned with respect to each other so that the vertical components of their fields tend to cancel at the midplane between them, while their horizontal components add. Thus, if the two arrays are equal in width and thickness, when the moving Halbach arrays are located equally above and below the track, no current is induced in the windings (and no force is exerted). However, if they move (as a unit) either up or down with respect to the track, a restoring force is exerted. In operation, in this example, the midplane between the magnets will lie below the midplane of the track conductors, so that a net levitation force will result, in equilibrium with the downward force of gravity.

A major advantage of the present configuration is that the levitating (horizontal) component of the field is approximately doubled relative to a single array, leading to a factor of two decrease in the current required in the track conductors for a given levitation force, corresponding to a potential factor-of-four reduction in the drag power losses. The result is that the Lift-to-Drag (L/D) ratio at operating loads can be increased by increasing the area of the magnets. This increase in area decreases the downward displacement required to levitate a given weight, and thus decreases the current required for levitation. In the conventional Inductrack described in U.S. Pat. No. 5,722,326, i.e., one employing a one-sided Halbach array, to increase the L/D ratio generally requires the use of inductive loading. An additional advantage for some applications is that the new configuration provides a restoring force for either upward or downward displacements of the Halbach arrays from the centered position, and thus can counteract aerodynamic loads, should they result in lifting forces (as in rocket launcher applications).

FIG. 1 shows dual Halbach arrays with vertical field cancellation according to the present invention. This configuration could be attached to and located on each side of a train car. The orientation of the upper Halbach array 10 and the lower Halbach array 12 is such that the horizontal components of the field add, while their vertical components cancel. Note the two outer poles 14, 16 of array 10 and 18, 20 of array 12 are pointed towards the midplane between the arrays and the center pole 20 of array 10 and 22 of array 12 are pointed away from the midplane. Poles 24 and 26 of array 10 and poles 28 and 30 of array 12 point toward the center pole of the respective array. With such a magnet configuration, no currents flow and there is no levitation when the track circuit array is centered between the two Halbach arrays. Only when there is a displacement will restoring forces be exerted. An advantage of such a system is that it provides a centering action, one that could be employed either vertically or horizontally.

Another advantage of the present configuration is that it produces a doubling of the horizontal field from the magnets, leading to an increased levitation force per unit area for a given induced current in the Inductrack circuit array. Thus, by increasing the area of the Halbach arrays, one can reduce the current required to levitate, and thus increase the levitation efficiency. This effect can be accomplished by either adjusting the lower Halbach array to make it thinner with respect to the upper array or by making the upper array wider with respect to the lower array.

Other embodiments of the present invention include a technique for establishing a higher degree of control over the levitation currents and efficiency by separating the functions of generation of induced currents and that of providing levitation. These embodiments also offer the possibility of combining the functions of levitation and sideways restraint into a one-track configuration that satisfies both requirements. They also allow the use of less expensive, lower remanent field, magnet material in the current-inducing part of the system, with potential economic savings, but with no loss in levitating force.

Figure 2:
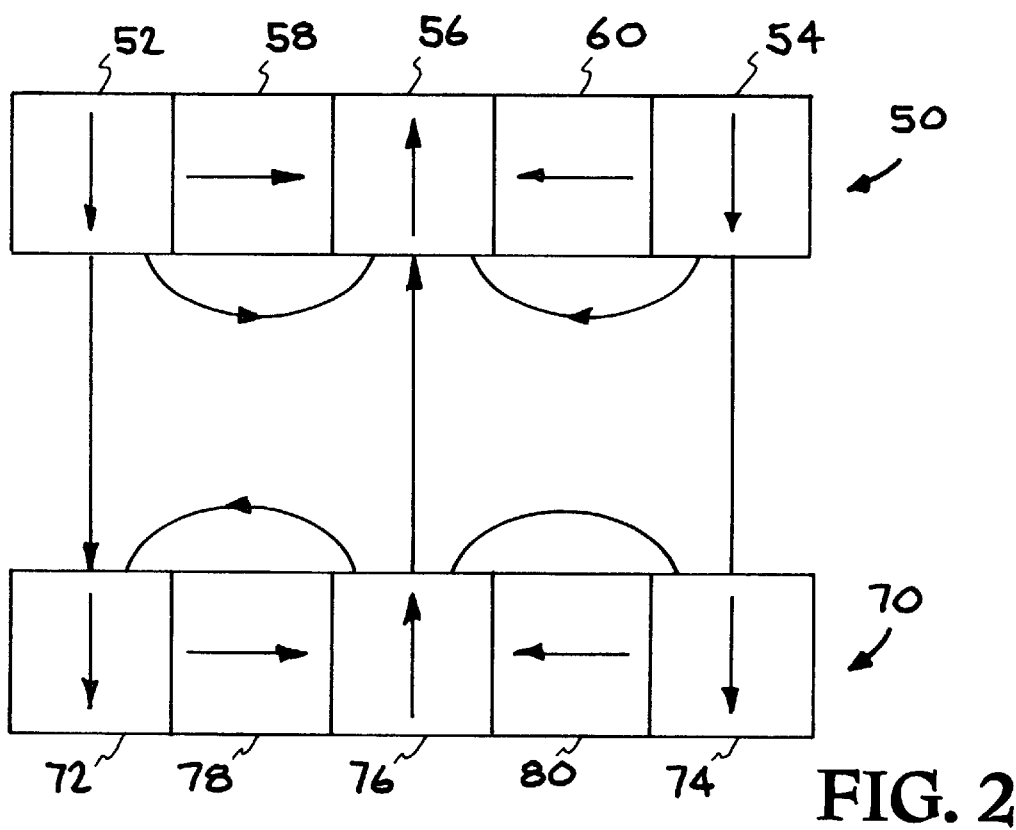
FIG. 2 shows a dual Halbach array where the components of the field lying in the midplane between the magnets cancel, and those perpendicular to the midplane add.

The separation of the functions of generation of induced currents and of providing levitation is accomplished by adding to the original Halbach array a second Halbach array with a different orientation of the magnets. With this orientation, as shown in FIG. 2, the components of the field parallel to the midplane between the magnets cancel, while those perpendicular to the midplane add. Thus this configuration is the opposite of the one shown in FIG. 1. Note that the pole faces 52, 54 of array 50 point toward the midplane while the pole faces 72, 74 of array 70 point away from the midplane. The pole face 76 of array 70 points toward the midplane and pole face 56 of array 50 points away from the midplane. Pole faces 58 and 60 of array 50 point toward the center magnet 56 of array 50. Pole faces 78 and 80 of array 70 point toward the center magnet 76 of array 70. In this configuration, the field component that induces current in a planar array of circuits between the two Halbach arrays is doubled at the midplane over that from a single Halbach array, so that the induced current per unit length of conductor is also doubled.

If a combined array is made to envelope a planar array of circuits located at the midplane, the array of FIG. 2 (Array 2) induces currents in the circuits that are proportional to its magnetic field and to its length in the direction of the currents. The array of FIG. 1 (Array 1), which does not generate induced currents when the circuits are in the centered position, responds to the currents induced by Array 2 to generate a levitating force. By adjusting the field and length of Array 2 one can therefore adjust the currents in the circuits (at the midplane) to create the desired level of levitation force and/or the levitation efficiency (Newtons/Watt).

Finally, if the planar circuit array is bent upward (or downward) at, for example, a right angle to the horizontal, it is possible to accomplish two desirable results. The first is that the horizontal part of the track array can be made to be smaller, while the track array in the vertical direction can be made as high as is necessary to produce the required currents. Also, the vertical arrays could use a less expensive magnet material than the high-field material that would likely be needed for the levitating magnets.

Figure 3:
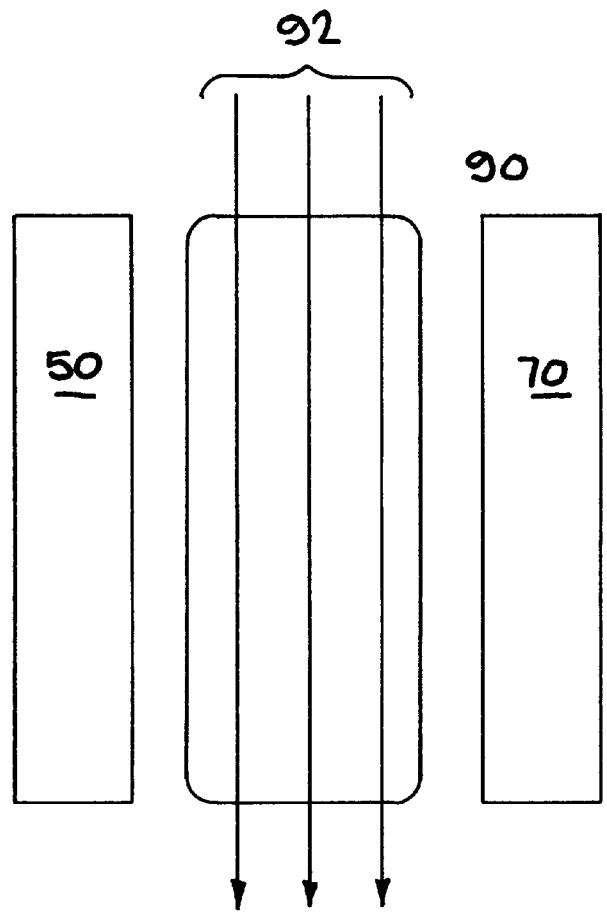
FIG. 3 shows the use of the dual Halbach array of FIG. 2 to provide a centering force (for sideways displacements) to a moving levitated object, while at the same time providing a means for applying driving and braking forces to the moving object.

The two functions described, i.e., providing both horizontal centering and driving/braking forces, are accomplished by the use of a special track circuit array, shown schematically in FIG. 3. As can be seen in this figure, between the two Halbach arrays 50, 70 (those of FIG. 2, shown in FIG. 3 in an end-on view) on the moving object there is located on the stationary track a column made up of "window-frame"

shorted coils 90. These coils, as can be seen from FIG. 3, intercept no net flux when they are centered with respect to the Halbach arrays on either side. However, when there is a sidewise displacement, flux will be coupled, inducing currents in these circuits, which interact with the Halbach array nearest the circuit, and thereby providing a sideways centering force resulting from the Halbach array pushing away from the circuit. In the centered position, no current is induced so that the power losses associated with providing centering action are minimized.

Interleaved, at half-wavelength intervals, with the window-frame coil array is an array of one or more conductors 92, symmetrically located with respect to the midplane of the window-frame coils. Each conductor of this interleaved array at a given axial location carries the same current, in the same direction, alternating in time in synchronism with the motion of the object so as to provide driving or braking forces as needed. As can be seen from inspection of FIGS. 2 and 3, the drive/braking windings do not couple inductively to the window-frame circuits, so that the two functions, i.e., centering and driving/braking, are electrically independent of each other.

In practice, it would be expected that this embodiment described in FIG. 3 would be used in conjunction with one of the previously disclosed Inductrack embodiments providing levitating forces. The new configuration would provide an energy-efficient means for sideways stabilization, while at the same time being used to provide driving and braking forces through the powered guideway circuits that are interleaved with the centering circuit array.

In the embodiment that combines FIGS. 1 and 2, an Inductrack magnet configuration is provided in which the functions of the generation of the levitating currents and of their use to produce levitation are separated, with the advantage of being able to tailor and control these functions optimally for the application at hand. An improved track configuration is now described that would employ this concept in a more efficient way.

Figure 4:
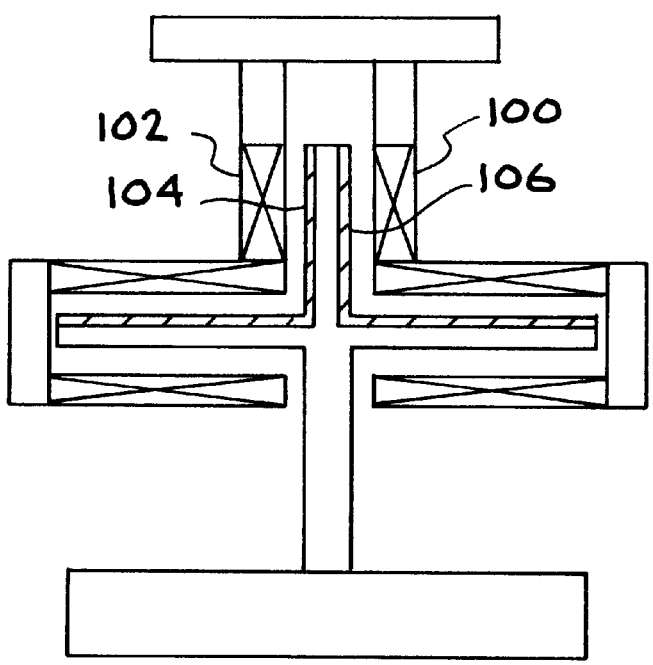
FIG. 4 shows vertically oriented "generator" Halbach arrays located at the midplane of the track, where they induce currents in two L-shaped "flat-track" circuits.

As shown in FIG. 4, the vertically oriented "generator" Halbach arrays 100 and 102 are located at the midplane of the track, where they induce currents in two substantially L-shaped "flat-track" circuits 104 and 106, placed back-to-back between the magnets of these arrays. In this way one "generator" section is enabled to drive the levitating currents in two track circuit arrays at the same time. By splitting the track circuits in this way, their inductance and resistance is reduced, and their mechanical rigidity is also increased. The generator Halbach arrays may be oriented in other than the L-shaped configuration with respect to the levitator Halbach arrays 108 and 110.

Not shown specifically on the figure is the feature of the system that would allow an optimization of the levitating currents to fit a given situation, or that could be used for control of the levitation height. This feature would operate as follows: By mechanically varying the spacing between the magnets of the vertically oriented Halbach arrays, the field between them can be increased or decreased, thus varying the levitation current induced in the two flat-track circuits.

A previously described "Ladder Track" for magnetic levitation systems such as the Inductrack (U.S. Pat. No. 5,722,326) employs slotted sheets of copper laminated with insulating bonding material to form an inexpensive and mechanically strong structure. However, as originally described, this kind of a track has the limitation that the distribution of the levitating current will not be uniform, decreasing downward with distance from the surface of the track. This non-uniformity arises from an effective vertical "skin-depth" effect, whereby the currents in the upper conducting strips of the track shield the lower conductors from the magnetic fluxes of the moving Halbach arrays on the moving levitated car. For this reason this type of track makes less efficient use of the conducting material than, for example, a track employing so-called litz wire cables in its construction. Litz wire is composed of many strands of insulated wire that are specially transposed so that each wire visits the inner and outer parts of the cable equally. In this way the skin effect is circumvented and the current is uniformly distributed throughout the cable.

A second limitation of the previously described ladder track is that it does not have provision for inductively loading the individual conducting strips. Inductive loading of the track conductors is advantageous in many applications of the Inductrack, since it results in an increased Lift-to-Drag ratio, while at the same time lowering the levitation transition speed.

Figure 5A:
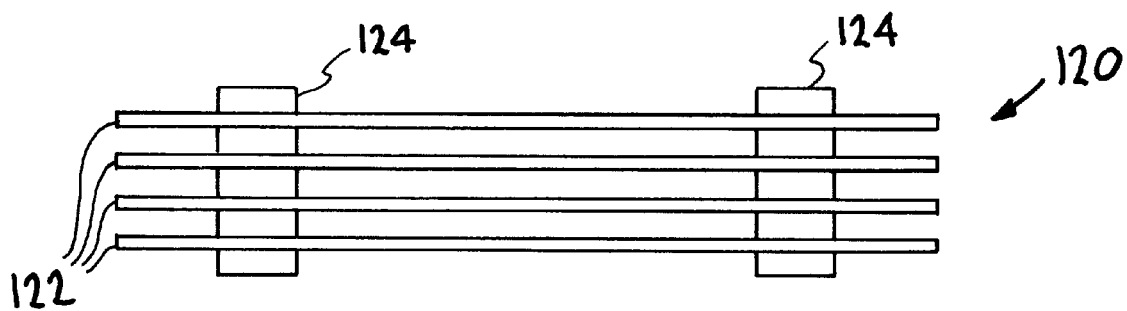
FIG. 5A shows an end view of a track is composed of laminated sheets of copper or aluminum that are slotted.
Figure 5B:
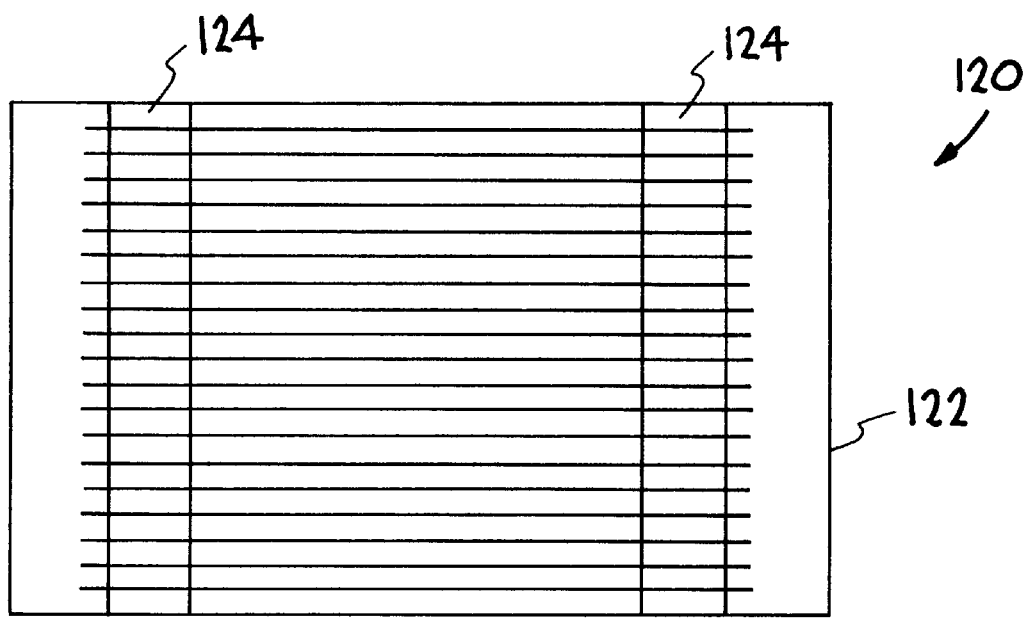
FIG. 5B shows a top view of the track of FIG. 5A.

The present invention includes an improved configuration over the prior art ladder track and incorporates a simple means of inductive loading that at the same time distributes the current more nearly uniformly throughout the vertical dimension of the track. The concept is shown in the FIGS. 5A and 5B. As shown in the end view of FIG. 5A, the track 120 is composed of laminated sheets 122 of copper or aluminum that are slotted as shown, with the slots being terminated at their ends to provide a path for the return currents. As also shown, inductive loading of each conductor is provided by including thin strips 124 of ferromagnetic material (iron, for example) near the ends of the slots. This inductive loading of each conductor has the additional effect of causing the current to be more evenly distributed with depth into the track, since the currents in each layer are reduced (relative to a track with no inductive loading). This reduction in current diminishes the shielding effect of the currents in the upper layers, thus allowing the vertical component of the field from the Halbach arrays to penetrate throughout the depth of the track. At the same time, the slotting and the use of thin sheets laminated together with insulating material reduces parasitic eddy currents that would otherwise cause extra power losses in the track, reducing its efficiency.

The propulsion mechanism used in the present invention may be a linear induction motor. Such a motor generally comprises a coil structure or winding assembly carried by the vehicle and juxtaposed with a rail of ferromagnetic material mounted upon and fastened to the track so that a magnetic path is closed through this rail and, with appropriate energization of the winding assembly, develops a magnetic force component in the direction of vehicle propulsion.

The linear motors are, in effect, a linearly-unrolled version of the rotary motors. Among currently-known examples of the linear motors are a linear d.c. motor (monopolar or multipolar), linear synchronous motor, linear induction motor and linear pulse motor. Thrust of the linear motors, corresponding to torque of the rotary motors, generally depends on the structure of the motors. Other propulsion mechanisms are usable in the present invention and will be apparent to those skilled in the art based on the disclosure herein.

The present invention may be employed in the improved Inductrack configuration described in a copending U.S. Patent Application titled, "Improved Inductrack Configuration" filed on the same day as the present application and incorporated herein by reference.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

I claim:

1. A magnet configuration, comprising;
   a first Halbach array having a first magnetic field and a second Halbach array having a second magnetic field, wherein said first Halbach array and said second Halbach array are magnetically and structurally connected together to form a first pair of Halbach arrays, wherein said first Halbach array comprises magnet configurations positioned with respect said second Halbach array and said second Halbach array comprises magnet configurations positioned with respect said first Halbach array such that a first component of said first magnetic field and a first component of said second magnetic field substantially cancel at a first plane between said first Halbach array and said second Halbach array, and a second component of said first magnetic field and a second component of said second magnetic field substantially add at said first plane;
   a track of windings between said first pair of Halbach arrays; and
   a propulsion mechanism for moving said first pair of Halbach arrays along said track, wherein when said first pair of Halbach arrays move along said track and said track is not located at said first plane, a current is induced in said windings and a restoring force is exerted on said first pair of Halbach arrays.

2. The magnet configuration of claim 1, wherein said first pair of Halbach arrays are substantially horizontally oriented, wherein said first component of said first magnetic field and said first component of said second magnetic field comprises a substantially vertical component, wherein said second component of said first magnetic field and said second component of said second magnetic field comprises a substantially horizontal component, wherein said first Halbach array is an upper array, and wherein said second Halbach array is a lower array relative to said upper array.

3. The magnet configuration of claim 1, further comprising a vehicle attached to said first pair of Halbach arrays.

4. The magnet configuration of claim 1, wherein due to the downward force of gravity, a midplane between said first pair of Halbach arrays will lie below said track, wherein said restoring force will provide a net levitation force.

5. The magnet configuration of claim 1, wherein said windings comprise a planar array of conductors electrically connected together at their ends.

6. The magnet configuration of claim 1, wherein said track is tilted from the horizontal to provide a centering force.

7. The magnet configuration of claim 1, wherein said first pair of Halbach arrays, when moving, have a characteristic lift-to-drag ratio at operating loads, wherein said lift-to-drag ratio can be increased by increasing an area of said first pair of Halbach arrays to decrease the downward displacement required to levitate a given weight, and thus decrease the current required for levitation.

8. The magnet configuration of claim 1, wherein said first Halbach array and said second Halbach array each comprise two outer poles that are pointed towards a midplane between said first Halbach array and said second Halbach array, wherein said first Halbach array and said second Halbach array each comprise a center pole that is pointed away from said midplane and poles adjacent to said center pole that point toward the center pole of the respective array.

9. The magnet configuration of claim 1, wherein said first pair of Halbach arrays are oriented substantially vertically to provide a centering action.

10. The magnet configuration of claim 1, wherein said first Halbach array is an upper array, and wherein said second Halbach array is a lower array relative to said array, wherein the current required to levitate said first pair of Halbach arrays may be adjusted by making said lower array to be thinner with respect to said upper array.

11. The magnet configuration of claim 1, wherein said first Halbach array is an upper array, and wherein said second Halbach array is lower array relative to said upper array, wherein the current required to levitate said first pair of Halbach arrays may be adjusted by making said upper array wider with respect to said lower array.

12. The magnet configuration of claim 1, further comprising means for separating the function of generation of induced currents in said track from the function of providing levitation.

13. The magnet configuration of claim 12, wherein said means for separating the function of generation of induced currents in said track from the function of providing levitation comprises adding to said first pair of Halbach arrays a second pair of Halbach array with a magnet orientation such that the components of the field lying in the midplane between each array of said second pair of Halbach arrays cancel, while those perpendicular to the midplane add.

14. The magnet configuration of claim 13, wherein said second pair of Halbach arrays comprise end pole faces that point in a first direction perpendicular to said arrays, and center pole faces that point in the opposite direction from that of said first direction, and pole faces adjacent to said center pole faces that point toward the center poles of their respective Halbach array of said second pair of Halbach arrays.

15. The magnet configuration of claim 14, wherein said track comprises two substantially L-shaped circuits placed back-to-back, wherein said first pair of Halbach arrays is operatively positioned to provide levitating force against said track, wherein said second pair of Halbach array is operatively positioned to drive the levitating currents that power said first pair of Halbach arrays.

16. The magnet configuration of claim 1, wherein said track comprises a column of electrically connected coils that intercept no net flux when they are centered with respect to the Halbach arrays on either side but when there is a sidewise displacement, flux will be coupled, inducing currents in these circuits, which interact with the Halbach array nearest the circuit, and thereby providing a sideways centering force resulting from the Halbach array pushing way from the circuit.

17. The magnet configuration of claim 16, further comprising an interleaved array of one or more conductors, symmetrically located with respect to the midplane of the said coils, wherein each conductor of said interleaved array at a given axial location carries the same current, in the same direction, alternating in time in synchronism with the motion of the object so as to provide driving or braking forces as needed.

18. The magnet configuration of claim 17, wherein said array of one or more conductors is configured to not couple inductively to said coils, so that the centering and driving/braking functions are electrically independent of each other.

19. The magnet configuration of claim 1, wherein the spacing between said first Halbach array and said second Halbach array is adjusted to increase or decrease the field between them, thus varying the levitation current induced in said track.

20. The magnet configuration of claim 1, wherein said track comprises laminated sheets of conductor, wherein said sheets comprise slots terminated at their ends to provide a path for the return currents, wherein each conductor is individually loaded with elements that comprise strips of ferromagnetic material near the ends of the slots.

21. A method for generating a restoring force upon a magnet configuration, comprising;

providing a first Halbach array having a first magnetic field and a second Halbach array having a second magnetic field, wherein said first Halbach array and said second Halbach array are magnetically and structurally connected together to form a first pair of Halbach arrays, wherein said first Halbach array comprises magnet configurations positioned with respect said second Halbach array and said second Halbach array comprises magnet configurations positioned with respect said first Halbach array such that a first component of said first magnetic field and a first component of said second magnetic field substantially cancel at a first plane between said first Halbach array and said second Halbach array, and a second component of said first magnetic field and a second component of said second magnetic field substantially add at said first plane;

positioning a track of windings between said first pair of Halbach arrays; and moving said first pair of Halbach arrays along said track, wherein when said first pair of Halbach arrays move along said track and said track is not located at said first plane, a current is induced in said windings and a restoring force is exerted on said first pair of Halbach arrays.

22. The method of claim 21, wherein said first pair of Halbach arrays are substantially horizontally oriented, wherein said first component of said first magnetic field and said first component of said second magnetic field comprises a substantially vertical component, wherein said second component of said first magnetic field and said second component of said second magnetic field comprises a substantially horizontal component, wherein said first Halbach array is an upper array, and wherein said second Halbach array is a lower array relative to said upper array.

23. The method of claim 21, wherein said first Halbach array is an upper array, and wherein said second Halbach array is a lower array relative to said upper array, wherein said first pair of Halbach arrays, when moving, have a characteristic lift-to-drag ratio at operating loads, the method further comprising increasing said lift-to-drag ratio by increasing an area of said first pair of Halbach arrays to decrease the downward displacement required to levitate a given weight, and thus decrease the current required for levitation.

24. The method of claim 21, wherein said first Halbach array is an upper array, and wherein said second Halbach array is a lower array relative to said upper array, further comprising making said lower array to be thinner with respect to said upper array to adjust the current required to levitate said first pair of Halbach arrays.

25. The method of claim 21, wherein said first Halbach array is an upper array, and wherein said second Halbach array is a lower array relative to said upper array, further comprising making said upper array wider with respect to said lower array to adjust the current required to levitate said first pair of Halbach arrays.

* * * * *